(No Model.)
S. H. HUNTER.
ENGINE SHAFT ROTATION INDICATOR.
No. 574,328. Patented Dec. 29, 1896.
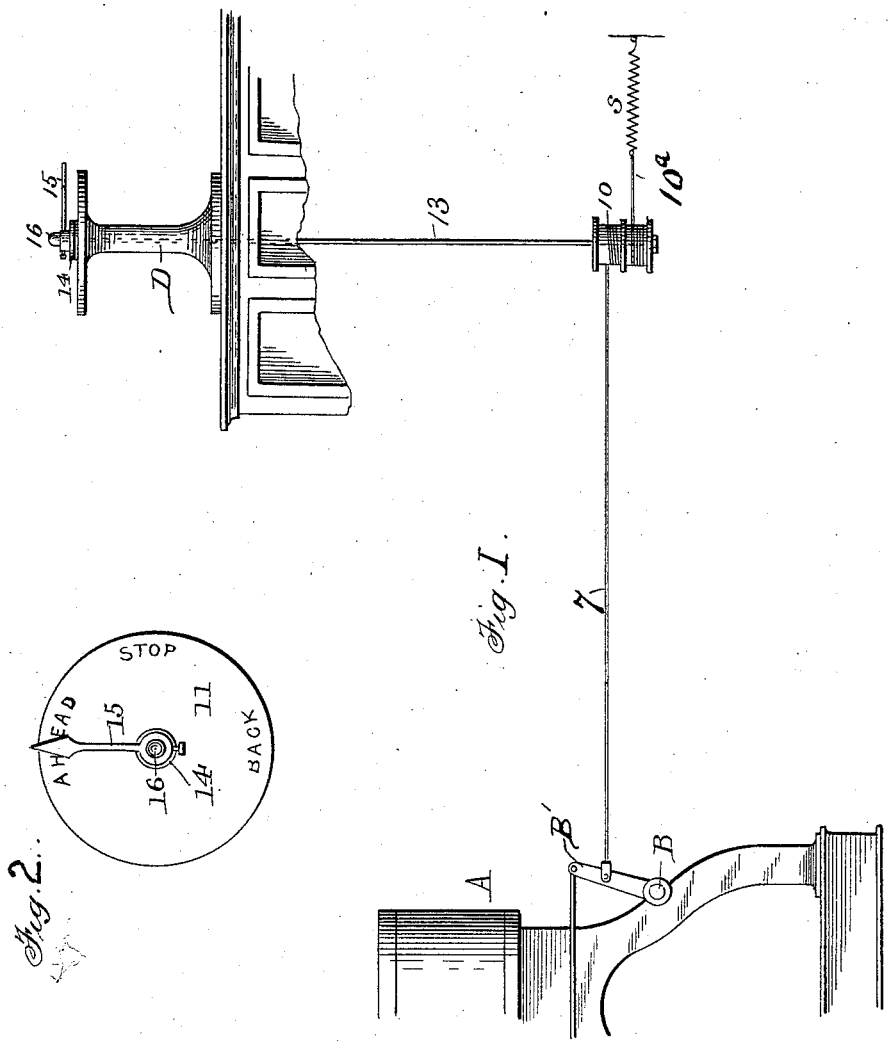
Witnesses
F. L. Oyrand
A. P. Smit
Inventor
Silas H. Hunter
By A. H. D...
Attorney

UNITED STATES PATENT OFFICE.

SILAS H. HUNTER, OF CLEVELAND, OHIO.

ENGINE-SHAFT-ROTATION INDICATOR.

SPECIFICATION forming part of Letters Patent No. 574,328, dated December 29, 1896.

Application filed March 13, 1896. Serial No. 583,038. (No model.)

*To all whom it may concern:*

Be it known that I, SILAS H. HUNTER, a citizen of the United States, residing at Cleveland, in the county of Cuyahoga and State of Ohio, have invented certain new and useful Improvements in Engine-Indicators; and I do declare the following to be a full, clear, and exact description of the invention, such as will enable others skilled in the art to which it appertains to make and use the same.

My invention has relation to improvements in means for imparting and indicating signals.

The object of the invention is to provide means or mechanism associated with a marine engine and leading by suitable conductors to the pilot-house whereby the engineer may with certainty conveniently and expeditiously announce and publish an order given to him relative to the operation of the engine.

With this object in view my invention consists of certain features of construction and combination of parts, which will be hereinafter fully described and claimed.

To enable others to understand my invention, I have illustrated the preferred embodiment thereof in the accompanying drawings, forming a part of this specification, and in which—

Figure 1 is a side view showing the apparatus complete and operated by a single cable and retracting-spring, the cable leading from the reversing-arm to the signal-shaft; and Fig. 2 is a plan view of the dial and indicator.

In the drawings, A denotes the outlines of the engine, and B the well-known element termed the "reversing-shaft," controlled by the associated mechanism under the manipulation of the engineer. On the reversing-shaft is an arm B', to which is connected one end of a cable 7, which is carried forward to a convenient point under the pilot or wheel house, and there has its end connected to one section of a drum 10. A short strand or cable 10ⁿ is wound around said drum in a reverse direction and is connected to a fixed part of the vessel by a retracting-spring s.

On the pilot-house is suitably secured a stand D, having a dial 11 formed on its upper end, on the face of which are displayed the words "Ahead," "Stop," and "Back," intended to indicate the movement about to be assumed by the boat, whether propulsion, rest, or retrogression. A vertical shaft-hole is formed in the hub of the stand, in which the vertically-disposed shaft 13 is arranged, substantially as shown.

The upper end of the shaft 13 projects through the dial, as indicated, and has secured thereon contiguous to the dial a collar 14, and immediately adjacent to the collar, through the shaft 13, is secured a pointer 15, which sweeps over the face of the dial and is intended to disclose by its position on the dial the order which has been communicated to the engineer. A cap 16 is fitted to and secured on the upper end of the shaft. The pointer 15 projects a short distance over the rim of the dial, so that in case of visual obstruction the position of the pointer may be ascertained by manipulation.

The shaft 13 extends through the hub of the dial-stand down "between-decks" and has the drum 10 suitably secured thereon.

The arm B', secured to the reversing-shaft, is so disposed in relation to the movements of the shaft and its connection with the drum, indicator-shaft, and pointer that when the reversing-shaft is rocked to start the engine the pointer will be turned to indicate the fact by being moved to the word "Ahead" on the dial, and the other movements of the reversing-shaft throwing the pointer to corresponding positions on the dial. When the reversing-shaft is thrown forward, the pointer marks "Ahead," and when the engineer "middles his link" the engine stops and the pointer is so moved, and when the reversing-shaft is rocked to reverse the engine that signal appears on the dial.

It will be borne in mind that these signals are given to the engineer by the captain or other officer in charge by means of proper communication, and that the signals displayed on the dial will at once verify whether the engineer has executed the order correctly.

From the foregoing description, taken in connection with the accompanying drawings, the construction and arrangement of the parts of my invention will be readily understood without requiring extended explanation. It will be noticed that the action of the spring s is positive and constant, so that when the reversing-arm rotates the drum to move the pointer to a certain point on the dial the recoil of the spring will exert itself when the arm is moved from such position and turn the drum accordingly.

I claim as my invention—

In a signaling apparatus for marine engines, the combination with the reversing-arm, of an engine reverse-shaft and a dial-stand situated adjacent to the pilot-house and provided with a suitable indicating-dial and with a vertical-shaft bearing, of a vertical shaft extending through said bearing and between-decks, said shaft having on its upper end a pointer, the free end of which extends beyond the periphery of the dial, a double drum secured to the lower end of the shaft, a cable connected to the reversing-arm and wound around and connected to one section of the double drum, a short cable or strand having one end wound reversely around the other section of the drum and secured thereto, a retracting-spring connected to the other end of the short cable or strand and to a fixed part of the vessel, whereby when the movement of the reversing-arm rotates the drum to move the pointer to a certain point on the dial, the recoil of the spring will exert itself when the arm is moved from such position and turn the drum accordingly, substantially as and for the purpose set forth.

In testimony whereof I hereunto affix my signature in presence of two witnesses.

SILAS H. HUNTER.

Witnesses:
　D. H. TILDEN,
　CHAS. E. FISH.